United States Patent
Gloanec et al.

(10) Patent No.: US 12,507,111 B2
(45) Date of Patent: Dec. 23, 2025

(54) METHOD FOR ACTIVATING A COMMUNICATION INTERFACE OF A RESIDENTIAL GATEWAY IN A LOCAL COMMUNICATION NETWORK, CORRESPONDING EQUIPMENT AND COMPUTER PROGRAM

(71) Applicant: Orange, Issy-les-Moulineaux (FR)

(72) Inventors: Simon Gloanec, Chatillon (FR);
Morgane Le Foll, Chatillon (FR);
Didier Le Mat, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 262 days.

(21) Appl. No.: 17/840,443

(22) Filed: Jun. 14, 2022

(65) Prior Publication Data
US 2022/0400400 A1 Dec. 15, 2022

(30) Foreign Application Priority Data
Jun. 14, 2021 (FR) ...................................... 2106224

(51) Int. Cl.
*H04W 4/80* (2018.01)
*H04L 12/28* (2006.01)
(Continued)

(52) U.S. Cl.
CPC ....... *H04W 28/0215* (2013.01); *H04W 72/51* (2023.01); *H04W 88/16* (2013.01)

(58) Field of Classification Search
CPC ........... H04W 4/80; H04W 4/38; H04W 4/02; H04W 8/005; H04W 12/33;
(Continued)

(56) References Cited

U.S. PATENT DOCUMENTS

| | | | | |
|---|---|---|---|---|
| 2005/0239445 A1* | 10/2005 | Karaoguz | ......... | H04M 15/8235 455/414.1 |
| 2013/0286889 A1* | 10/2013 | Cherian | .................. | H04L 63/18 370/254 |

(Continued)

FOREIGN PATENT DOCUMENTS

| | | |
|---|---|---|
| EP | 1 895 713 A1 | 3/2008 |
| EP | 2 608 454 A2 | 6/2013 |
| WO | WO 2010/044714 A1 | 4/2010 |

OTHER PUBLICATIONS

French Search Report for French Application No. 2106224, dated Feb. 28, 2022.

*Primary Examiner* — Kharye Pope
(74) *Attorney, Agent, or Firm* — Knobbe, Martens, Olson & Bear, LLP (57) ABSTRACT

A method for activating at least one communication interface of a residential gateway of a local communication network to which a main item of equipment configured for connecting to the at least one communication interface of the residential gateway is connected is disclosed. This method is implemented by at least one secondary item of equipment configured for communicating with the at least one main item of equipment via a first wireless communication channel, and with the residential gateway via a second wireless communication channel associated with at least one other communication interface of the residential gateway. This method includes transmitting to the at least one main item of equipment, over the first wireless communication channel, of a message controlling the at least one main item of equipment, and transmitting to the residential gateway, over the second wireless communication channel, of a request to activate the at least one communication interface.

9 Claims, 5 Drawing Sheets

(51) Int. Cl.
    *H04W 28/02*   (2009.01)
    *H04W 72/51*   (2023.01)
    *H04W 88/16*   (2009.01)

(58) Field of Classification Search
    CPC ......... H04W 52/0245; H04W 52/0274; H04W
                  84/12; H04W 52/383; H04W 52/367;
                  H04W 52/283; H04W 52/245; H04W
                  84/20; H04L 12/2803; H04L 2012/2841;
                  H04L 12/2809; H04L 65/1023; H04L
                  2012/2849; H04L 67/025; H04L 12/28;
                                            H04L 12/282
    See application file for complete search history.

(56)            References Cited

U.S. PATENT DOCUMENTS

| | | | |
|---|---|---|---|
| 2014/0118120 A1* | 5/2014 | Chen ................. | G08C 23/04 |
| | | | 340/12.5 |
| 2016/0255662 A1* | 9/2016 | Kotecha .............. | H04W 76/12 |
| | | | 370/254 |
| 2016/0381143 A1* | 12/2016 | Malik ................. | H04L 67/141 |
| | | | 455/518 |
| 2016/0381144 A1* | 12/2016 | Malik ................. | H04W 8/005 |
| | | | 455/517 |
| 2017/0257257 A1* | 9/2017 | Dawes ................ | H04L 41/06 |
| 2019/0132796 A1* | 5/2019 | Huang ................ | H04W 40/244 |
| 2019/0259374 A1* | 8/2019 | Kwon ................. | H04N 21/43615 |
| 2019/0394725 A1* | 12/2019 | Hu .................... | H04W 52/0206 |
| 2021/0126971 A1* | 4/2021 | Tilchen ............... | G01D 4/006 |
| 2022/0308650 A1* | 9/2022 | Krishnakumar ...... | G06F 1/3265 |

\* cited by examiner

METHOD FOR ACTIVATING A COMMUNICATION INTERFACE OF A RESIDENTIAL GATEWAY IN A LOCAL COMMUNICATION NETWORK, CORRESPONDING EQUIPMENT AND COMPUTER PROGRAM

CROSS-REFERENCE TO RELATED APPLICATIONS

This application claims foreign priority to French Patent Application No. FR 2106224, entitled "METHOD FOR ACTIVATING A COMMUNICATION INTERFACE OF A RESIDENTIAL GATEWAY IN A LOCAL COMMUNICATION NETWORK, CORRESPONDING EQUIPMENT AND COMPUTER PROGRAM" and filed Jun. 14, 2021, the content of which is incorporated by reference herein in its entirety.

BACKGROUND

Field

The field of the development is that of a domestic or professional local communication network, managed by a gateway, referred to as a residential gateway, to which user equipment is connected.

In particular, the development relates to the activation of one or more communication interfaces of the cable or wireless type, previously deactivated, of the residential gateway, according to the actual use of them.

Description of the Related Technology

A great majority of homes are equipped with a residential gateway, often referred to as a box or home gateway (HGW). This equipment, installed at the customers, is the element concentrating all the connections, services and applications supplied by the operator. This is because the gateway is connected firstly to the network of the operator and secondly has a set of interfaces, wireless or cable, providing the connection of a plurality of items of equipment within a local communication network, such as for example a digital decoder (set-top box or STB), a computer, a telephone, a digital television set, etc.

Hereinafter, the term "interface" is used for designating both a software component and a hardware component or a set of hardware and software components.

The residential gateway comprises a plurality of communication interfaces enabling it to establish a connection with the various items of equipment in the communication network by means of various communication protocols such as for example Wi-Fi®, Bluetooth, Bluetooth Low Energy (BLE) etc. These communication interfaces consume more or less energy according to the communication protocol used.

Wi-Fi®, standing for "Wireless Fidelity", is a technology that in particular allows a wireless connection between several items of equipment within a wireless communication network (wireless local area network or WLAN), such as for example a residential gateway and user equipment, via in particular a wireless communication interface of the Wi-Fi type present within the gateway.

Currently, Wi-Fi frequencies are the 2.4 GHz and 5 GHz bands. The majority of residential gateways use a so-called dual-band technology based on the use of the two Wi-Fi frequencies 2.4 GHz and 5 GHz.

When they are connected via a Wi-Fi wireless connection to the residential gateway, the items of equipment in the local communication network mainly use the 2.4 GHz frequency. Some items of equipment are however capable of connecting at the 5 GHz frequency, introduced more recently into the network, which offers a higher bit rate: this is the case for example with the set-top box.

At the present time, citizens are more and more concerned about the future of the planet, which leads them to attempt to reduce waste of energy resources.

In the house or business connected, reducing energy consumption involves stopping or putting on stand-by unused equipment or at least some of the components, applications or interfaces thereof. In particular, one of the routes for optimising the electrical consumption of the components of the residential gateway is to dynamically activate or deactivate some communication interfaces of the gateway in order to keep active only the one that is actually useful for the end user.

In other words, in order to limit energy consumption, the communication interfaces consuming a great deal of energy are deactivated by default, whereas the interfaces consuming little energy remain activated.

At the present time, in the case of the 5 GHz Wi-Fi interface of the residential gateway, there does not exist any mechanism for automatically reactivating this interface when the presence is detected, in the local communication network, of equipment compatible with the 5 GHz frequency, such as for example a set-top box.

One of the solutions is therefore to periodically wake up the 5 GHz Wi-Fi communication interface of the residential gateway, for example every 30 seconds, in order to detect the presence of compatible equipment in the communication network.

Thus, in the case of the 5 GHz Wi-Fi communication interface of the residential gateway, it is activated only if the user actually needs it, i.e. when they wish for an item of equipment in the communication network, such as for example the set-top box, to connect via this Wi-Fi frequency to the WLAN communication network and therefore to the residential gateway, for example to access a service such as a service consuming digital content.

However, this solution of periodic waking up, or activation, gives rise to a latency that may have an impact on the experience of the user. This is because, in one example, if the detection of an item of equipment compatible with the 5 GHz Wi-Fi frequency is programmed to take place every 30 seconds, i.e. the 5 GHz Wi-Fi communication interface is activated every 30 seconds, this means that the equipment, such as for example the set-top box, on waking up, will potentially have to wait for 30 seconds before connecting to the WLAN communication network via the 5 GHz Wi-Fi frequency.

To limit this latency, it is always possible to reduce this frequency of waking up the 5 GHz Wi-Fi interface. However, if the residential gateway must reinitiate its 5 GHz Wi-Fi interface very frequently, then the energy saving is limited.

There therefore exists a need for a technique for the dynamic waking up, or activation, of a communication interface of the residential gateway, such as the 5 GHz Wi-Fi wireless communication interface, which does not have this drawback. In particular, there is a need for such a technique making it possible to improve the quality of experience of the user while limiting the latency time between the instant when the user wishes to use an item of equipment and the instant where this equipment connects to the communication network via a previously deactivated communication interface of the residential gateway, while optimising the energy consumption.

SUMMARY

The development meets this need by proposing a method for activating at least one communication interface of a residential gateway of a local communication network to which at least one main item of equipment configured for connecting to said at least one communication interface of the residential gateway is connected. This method is implemented by at least one secondary item of equipment configured for communicating with said at least one main item of equipment via a first wireless communication channel, and with the residential gateway via a second wireless communication channel associated with at least one other communication interface of the residential gateway. This method comprises:

- a transmission to said at least one main item of equipment, over the first wireless communication channel, of a message controlling said at least one main item of equipment, and
- a transmission to the residential gateway, over the second wireless communication channel, of a request to activate said at least one communication interface.

Thus, the development is based on an entirely novel and inventive approach of the activation, or waking up, of a communication interface of the residential gateway deactivated by default, such as for example a cable communication interface of the Ethernet type, or wireless of the 5 GHz Wi-Fi type.

More particularly, when the user wishes to use an item of equipment in the communication network, referred to as the main item of equipment, to access a service via the residential gateway requiring a connection to a deactivated communication interface of the gateway, the development proposes to use another item of equipment, referred to as a secondary item of equipment, configured for communication firstly with the main item of equipment and secondly with the residential gateway.

For this purpose, firstly, when the user wishes to use the main item of equipment of the communication network, such as for example a set-top box, the user sends a control message to this main item of equipment via a secondary item of equipment configured for communicating therewith, such as for example a remote control controlling the set-top box. More particularly, conventionally and as known from the prior art, on request from the user, the secondary item of equipment transmits to the main item of equipment a message controlling the latter. This control message can be transmitted over a communication channel based for example on a communication protocol of the Bluetooth Low Energy (BLE) type.

In order to be able to access the service requested by the user, if the main item of equipment has to connect to a communication interface of the gateway that was deactivated to limit the energy consumption thereof, the development makes it possible to transmit a control message to the main item of equipment over a first wireless communication channel and to transmit, over a second wireless communication channel, a request to activate the communication interface to which the main item of equipment must connect.

In the previous example, in order to access a service consuming digital content, the set-top box is configured for connecting to a communication interface of the residential gateway, in particular to the 5 GHz Wi-Fi wireless communication interface, which is deactivated, when it is not being used, to limit the energy consumption.

In order to activate the 5 GHz Wi-Fi wireless communication interface of the residential gateway, the user then uses the remote control of the set-top box, configured for communicating with the set-top box and the residential gateway, via an active communication channel, such as for example a BLE communication channel.

Thus, the remote control transmits to the set-top box a message controlling the set-top box, in a conventional manner known from the prior art (for example by the user pressing on the start/stop button of the remote control). Furthermore, the remote control transmits to the residential gateway a request to activate the communication interface to which the set-top box must connect, in this example the 5 GHz Wi-Fi wireless communication interface of the residential gateway.

Thus, the user sends, via a secondary item of equipment, here the remote control, a control message to the main item of equipment, in this example the set-top box, and a request to activate the communication interface of the residential gateway enabling the set-top box and the residential gateway to communicate together, typically the 5 GHz Wi-Fi communication interface.

Thus, any latency time between the moment when the main item of equipment receives and processes its control message and the moment where the communication interface that it needs on the gateway is activated is eliminated.

The communication interface, for example the 5 GHz Wi-Fi wireless communication interface of the residential gateway, is activated solely in the case of actual use. The activation/deactivation of this communication interface on demand makes it possible to reduce the electrical consumption of the residential gateway, while avoiding any latency time detrimental for the main item of equipment that needs to connect thereto.

According to one feature of the development, the request to activate said at least one communication interface is transmitted prior to the transmission to said at least one main item of user equipment of the message controlling said at least one main item of equipment.

Advantageously, the transmission of the request to activate the deactivated communication interface of the residential gateway, prior to the transmission of the message controlling the main item of equipment, makes it possible to activate the interface in question before the main item of equipment is activated. Thus, the main item of equipment can connect to the henceforth active communication interface of the residential gateway without any latency time.

According to another feature of the development, the request to activate said at least one communication interface comprises information for activating said at least one communication interface.

Advantageously, this activation interface allows, for example, the modification of a value of a control characteristic for activation of a proprietary profile of a BLE communication protocol and thus the activation of the communication interface of interest.

According to a particular aspect of the development, the request to activate said at least one communication interface furthermore comprises information identifying said at least one communication interface.

Advantageously, this identification interface makes it possible for example to modify a value of a characteristic identifying the communication interface to be activated of a proprietary profile in a BLE communication protocol and therefore the activation of the communication interface of interest. In other words, in the case where a plurality of different communication interfaces are deactivated within the residential gateway, it is possible to choose whether one or more communication interfaces must be activated and if so, which.

According to another particular aspect of the development, the first wireless communication channel and the second wireless communication channel are based on a communication protocol selected from: Bluetooth, Bluetooth Low Energy, Z-Wave, Zigbee, DECT-ULE, Li-Fi, 4G, 5G or 6 GHz Wi-Fi.

Advantageously, the residential gateway comprises various wireless communication interfaces enabling it to communicate via various communication channels with one or more main items of equipment of the local area network and at least one secondary item of equipment configured for controlling all or some of these main items of equipment. The gateway may, for example, be connected to these items of equipment via a wireless communication channel based on wireless communication protocols of the Bluetooth, Bluetooth Low Energy, Z-Wave, Zigbee, DECT-ULE (standing for "Digital Enhanced Cordless Telecommunication—Ultra Low Energy"), Li-Fi (standing for "Light Fidelity"), 4G, 5G, 6 GHz Wi-Fi etc type. Advantageously, the wireless communication interfaces associated with these various communication channels remain active within the residential gateway, for example because they consume less energy.

According to another particular aspect of the development, the first wireless communication channel and the second wireless communication channel are based on one and the same communication protocol.

The development also relates to an item of equipment configured for communicating with a main item of equipment via a first wireless communication channel, and with a residential gateway of a local communication network to which said at least one main item of equipment is connected via a second wireless communication channel. This equipment comprises a module for activating at least one communication interface of the residential gateway to which the main item of equipment is able to connect. The communication interface is distinct from a communication interface with which the second wireless communication interface is associated. The activation module is configured for:

transmitting a control message to said at least one main item of equipment over the first wireless communication channel, and transmitting to the residential gateway a request to activate said at least one communication interface over the second wireless communication channel.

The development also relates to a computer program product comprising program code instructions for implementing the activation method as described above, when it is executed by a processor.

A program may use any programming language, and be in the form of source code, object code, or code intermediate between source code and object code, such as in a partially compiled form, or in any other desirable form.

The development also relates to a recording medium that can be read by a computer on which a computer program comprising program code instructions for executing steps of the method according to the development as described above is recorded.

Such a recording medium may be any entity or device capable of storing the program. For example, the medium may include a storage means, such as a ROM, for example a CD ROM or a microelectronic circuit ROM, or a magnetic recording means, for example a mobile medium (memory card) or a hard disk or an SSD.

Moreover, such a recording medium may be a transmissible medium such as an electrical or optical signal, which can be conveyed via an electrical or optical cable, by radio or by other means, so that the computer program that it contains can be executed remotely. The program according to the development may in particular be downloaded over a network, for example the internet.

Alternatively, the recording medium may be an integrated circuit in which the program is incorporated, the circuit being adapted for executing or for being used in the execution of the aforementioned display control method.

According to an example embodiment, the present technique is implemented by means of software and/or hardware components. In this light, the term "module" can correspond in this document just as well to a software component or to a hardware component or to a set of hardware and software components.

A software component corresponds to one or more computer programs, one or more subprograms of a program, or more generally to any element of a program or software able to implement a function or a set of functions, according to what is described below for the module concerned. Such a software component is executed by a data processor of a physical entity (terminal, server, gateway, set-top box, router, etc.) and is able to access the hardware resources of this physical entity (memories, recording media, communication bus, input/output electronic cards, user interfaces, etc.). Hereinafter, resources means any sets of hardware and/or software assemblies supporting a function or a service, whether they be unitary or combined.

In the same manner, a hardware component corresponds to any element of a hardware assembly able to implement a function or a set of functions, according to what is described below for the module concerned. It may be a case of a programmable hardware component or one with an integrated processor for executing software, for example an integrated circuit, a chip card, a memory card, an electronic card for executing firmware, etc.

Each component of the previously described system naturally uses its own software modules.

The development also relates to a system for activating at least one communication interface of a residential gateway of a local communication network to which at least one main item of equipment configured for connecting to said at least one communication interface of the residential gateway is connected. This system comprises a residential gateway and at least one item of equipment, referred to as a secondary item of equipment, as described previously.

The various embodiments mentioned above can be combined with each other for implementing the present technique.

The aforementioned equipment, computer program and corresponding system have at least the same advantages as those conferred by the method for activating at least one communication interface of a residential gateway according to the present development.

BRIEF DESCRIPTION OF THE DRAWINGS

Other aims, features and advantages of the development will emerge more clearly from the reading of the following description, given way of simple illustrative and non-limitative example, in relation to the figures, among which.

DETAILED DESCRIPTION OF CERTAIN ILLUSTRATIVE EMBODIMENTS

The general principle of the development is based on the dynamic waking up, or activation, of a communication interface of the residential gateway deactivated by default, such as the 5 GHz Wi-Fi wireless communication interface, using the possible interactions between the gateway and the various items of user equipment, such as for example a remote control of a set-top box (STB), a smartphone, a tablet, etc.

More particularly, the development makes it possible to take advantage of the presence of one or more other communication interfaces already activated within the residential gateway, such as for example a communication interface using a Bluetooth Low Energy (BLE) wireless communication protocol, for activating, solely when necessary, a communication interface deactivated by default, such as a 5 GHz Wi-Fi wireless communication interface.

For this purpose, the development is based on a transmission by an item of equipment, referred to as a secondary item of equipment, of a message controlling an item of equipment of the communication network, referred to as the main item of equipment, and of a request for waking up, or activating, at least one deactivated communication interface of the residential gateway.

In other words, when the user wishes to use an item of equipment of the communication network, referred to as the main item of equipment, to access a service requiring a connection to a communication interface of the residential gateway that is in the inactive state, it can use another item of equipment, referred to as a secondary item of equipment, configured for connecting and communicating with the main item of equipment on the one hand and the residential gateway on the other hand, via a communication channel associated with another active communication interface of the gateway, distinct from the deactivated communication interface.

By means of this secondary item of equipment and the presence of communication interfaces already active within the gateway, a message controlling the main item of equipment and a request for waking up, or activating, the deactivated communication interface of the residential gateway are transmitted by the secondary item of equipment.

According to a variant of the development, this request for waking up, or activating, the deactivated communication interface of the residential gateway is transmitted prior to the transmission of the message controlling the main item of equipment. The communication interface of the residential gateway is then activated before the main item of equipment is activated.

Thus, the main item of equipment can as soon as it wakes up connect to the communication interface of the residential gateway henceforth activated. In other words, the activation of the communication interface of the gateway that the main item of equipment needs occurs prior to the activation of the main item of equipment by the user, which makes it possible to avoid the latency times, while guaranteeing reduction in the energy consumption.

Figure 1:
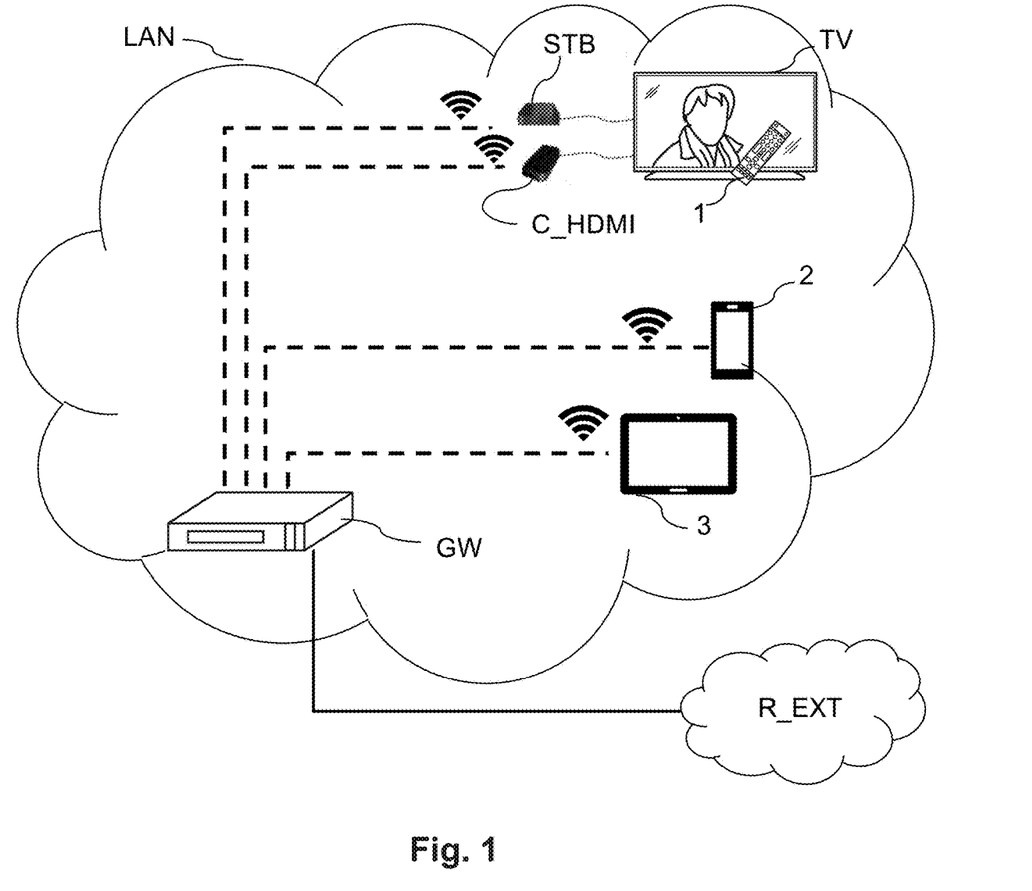
FIG. 1 illustrates an example of an environment for implementing the development according to a particular embodiment.

An example of an environment for implementing the development is now presented, in relation to FIG. 1, according to a particular embodiment.

The environment illustrated in FIG. 1 comprises in particular a local communication network LAN that is managed by a residential gateway GW connected to a data communication network R EXT of an operator.

In this example, the LAN network is a domestic network, to which a plurality of items of equipment are connected, such as:

- a set-top box STB associated with a remote control 1 for remotely controlling the set-top box STB, via for example a Bluetooth Low Energy wireless connection,
- an HDMI key C_HDMI,
- a smartphone 2,
- a tablet 3.

The set-top box STB and the HDMI key C_HDMI are connected to a television set TV for reproducing a video content, such as for example a film.

In one example, the set-top box STB, the HDMI key C_HDMI, the telephone 2 and the tablet 3 are connected to the gateway GW by a radio wireless connection in a wireless local communication network, WLAN, for example Wi-Fi on a frequency of 2.4 GHz or 5 GHz. Naturally other types of wireless connection can be used such as Wi-Fi on a 6 GHz frequency, Bluetooth, Bluetooth Low Energy, Z-Wave, Zigbee, DECT-ULE (Digital Enhanced Cordless Telecommunications—Ultra Low Energy), 4G, 5G or Li-Fi etc.

In another example, the set-top box STB is connected to the gateway GW by a cable connection, such as an Ethernet connection.

In order to establish a connection between the various items of equipment in the network, or with equipment outside the communication network, and the residential gateway GW, the latter comprises a plurality of cable or wireless communication interfaces. More particularly, these various communication interfaces use different communication protocols making it possible to establish various communication channels between the gateway and the equipment of the network or outside the network.

In one example, the gateway comprises a wireless communication interface making it possible to establish a communication channel based on a communication protocol of the Bluetooth Low Energy type with one of the items of equipment in the network, such as for example the smartphone 2, or an item of equipment not belonging to the communication network but configured for controlling an item of equipment in the communication network, such as for example the remote control 1.

The gateway GW may also comprise a 5 GHz Wi-Fi communication interface for establishing a Wi-Fi wireless connection on a frequency of 5 GHz with, for example, the HDMI key C_HDMI or the set-top box STB.

Figure 2A:
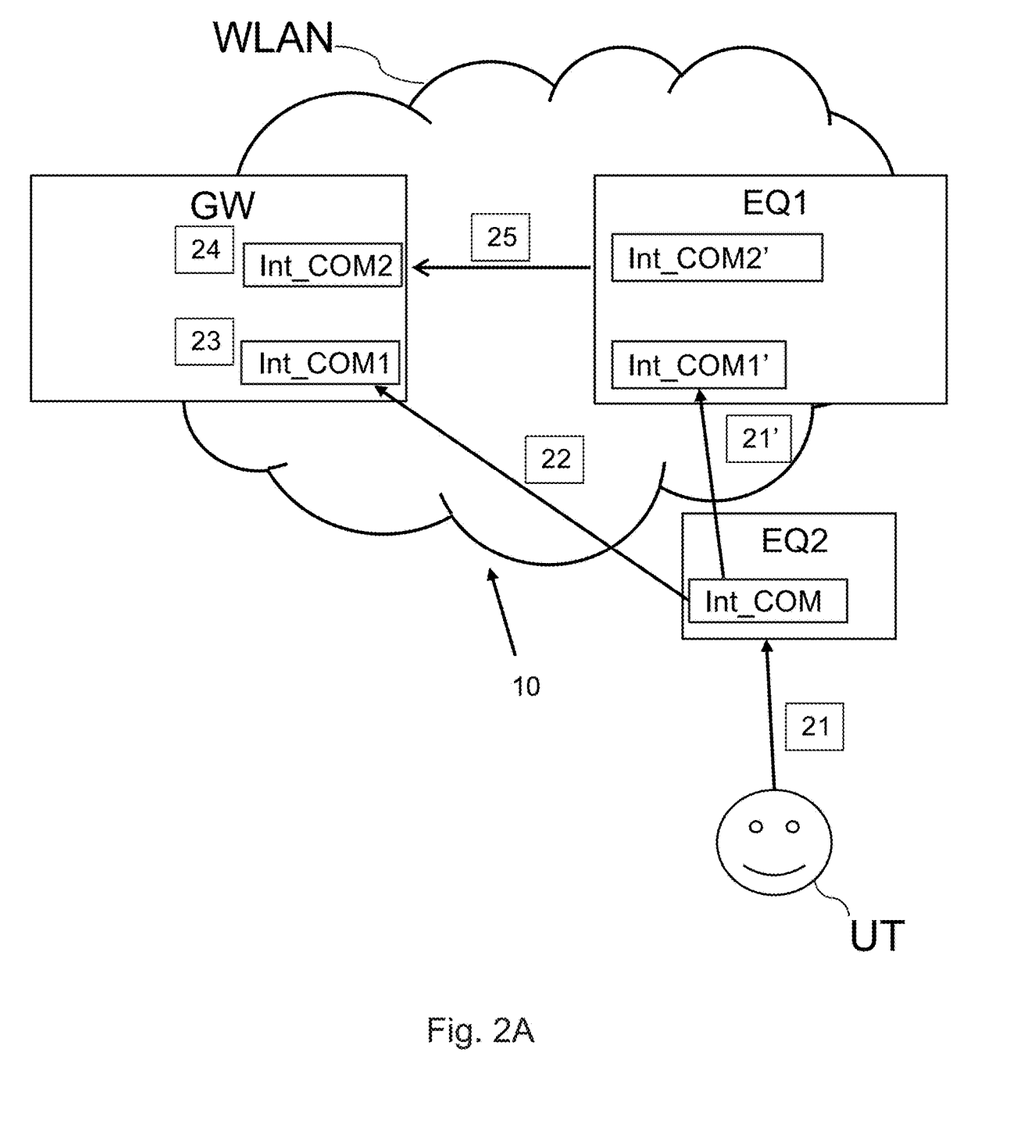
FIG. 2A illustrates an example of architecture of a system for activating a communication interface of a gateway managing the local communication network according to one embodiment of the development.
Figure 2B:
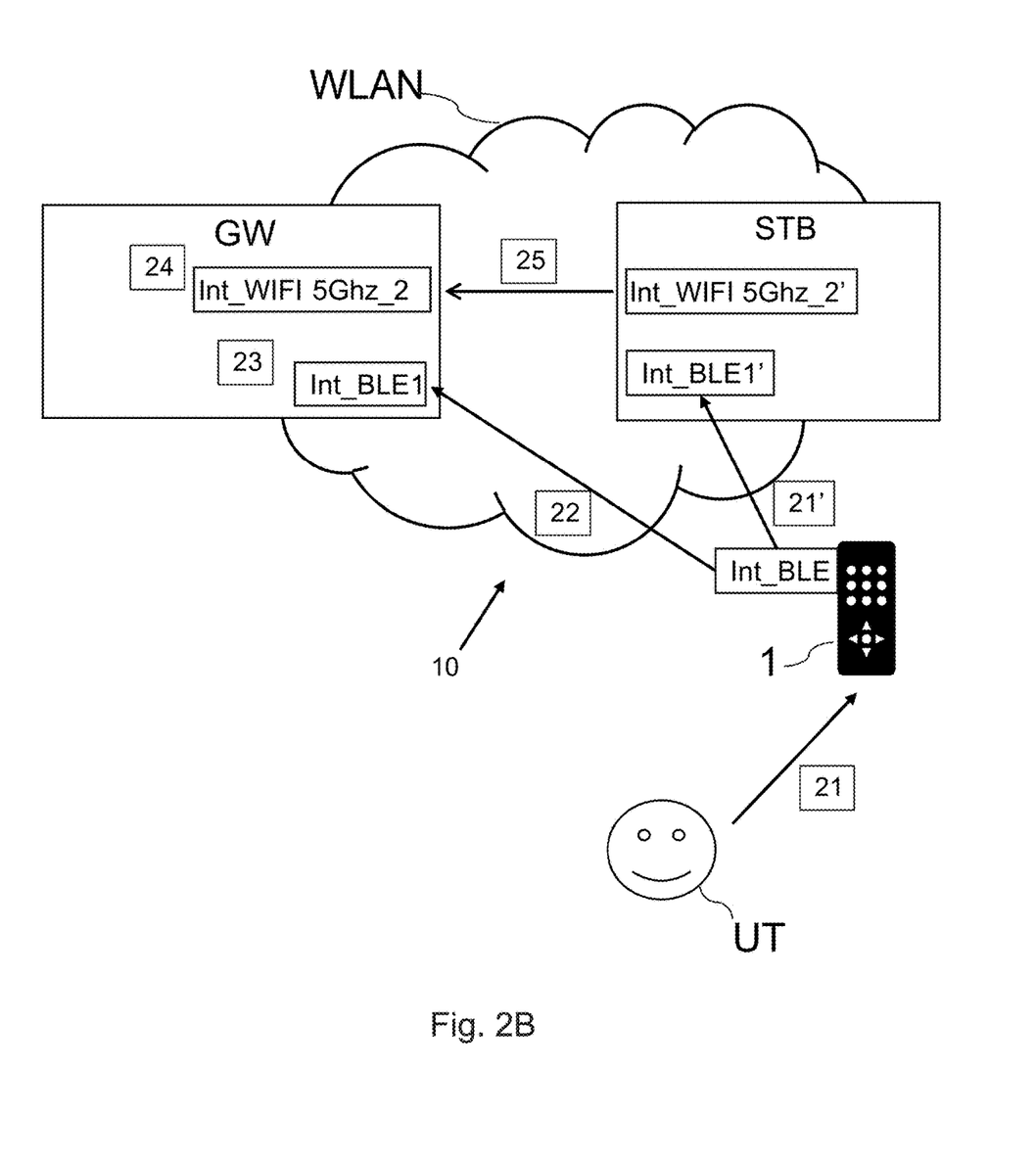
FIG. 2B illustrates an example of architecture of a system for activating a communication interface of a gateway managing the local communication network according to one particular embodiment of the development.

FIG. 2A and FIG. 2B illustrate examples of architecture of a system 10 for managing a system for activating at least one communication interface of a management gateway of the local communication network according to embodiments of the development.

This management system 10 comprises among other things the gateway GW for managing the wireless communication network WLAN, or residential gateway, as well as a plurality of items of equipment, including at least one main item of equipment EQ1 belonging to this communication network, such as for example a set-top box STB, an HDMI key C_HDMI, and at least one item of secondary equipment EQ2 belonging to the communication network, such as for example a smartphone 2, or not belonging to the communication network, such as for example a remote control 1. It should be noted that the concept of belonging to the network underlies the concept of IP protocol: in this regard, the remote control does not belong to the local network, although it is a geographically "local" item of equipment, which makes it possible to use short-distance radio links in an embodiment of the development.

Main item of equipment EQ1 means an item of equipment in the communication network WLAN that the user wishes to use to access a service via the residential gateway GW, such as a service for consumption of digital content for example. The main item of equipment EQ1 is configured for connecting via a communication interface Int_COM2' to a communication interface Int_COM2 of the residential gateway GW for accessing the service requested. When the communication interface Int_COM2 of the gateway is not being used, i.e. when no equipment in the network is connected thereto, it is by default deactivated to save on energy.

In the example in relation to FIG. 2B, the main item of equipment EQ1 is for example the set-top box STB, and the communication interface of the residential gateway Int_COM2 and the communication interface of the set-top box Int_COM2' are wireless communication interfaces of the 5 GHz Wi-Fi type. By default, to save on energy, the 5 GHz Wi-Fi wireless communication interface of the gateway GW is deactivated.

The set-top box STB is therefore configured for connecting and exchanging data with the residential gateway GW via a connection between their 5 GHz Wi-Fi wireless communication interface Int_WiFi 5GHz_2 and Int_WiFi 5GHz_2'. This is because the set-top box STB forms part of the items of equipment compatible with the 5 GHz Wi-Fi frequency of the residential gateway GW, which makes it possible to receive a digital content in 5 GHz Wi-Fi between the gateway GW and the set-top box STB.

In a variant, the communication interface of the residential gateway Int_COM2 and the communication interface of the set-top box Int_COM2' are cable communication interfaces of the Ethernet type.

Secondary item of equipment EQ2 means an item of equipment belonging or not to the communication network WLAN used by the user for controlling the main item of equipment EQ1. The secondary item of equipment EQ2 is configured for connecting, via a communication interface Int_COM, to a wireless communication interface Int_COM1' of the main item of equipment EQ1. In other words, the secondary item of equipment EQ2 communicates with the main equipment EQ1, via a wireless communication channel established between the communication interfaces Int_COM of the secondary equipment EQ2 and the communication interface Int_COM1' of the main item of equipment EQ1.

The wireless communication interface Int_COM of the secondary item of equipment EQ2 is also configured for establishing a connection with an already activated wireless communication interface Int_COM1 of the residential gateway GW.

In the example in relation to FIG. 2B, the remote control 1 is the secondary item of equipment EQ2 that communicates with:

the set-top box STB, which is then the main item of equipment EQ1, via a wireless communication channel of the BLE type established between the communication interfaces Int_BLE of the remote control 1 and the communication interface Int_BLE1' of the set-top box STB, and the gateway GW via a wireless communication channel of the BLE type established between communication interfaces Int_BLE and Int_BLE1.

In a variant, the wireless communication interfaces of the gateway Int_COM1, of the secondary item of equipment Int_COM and of the main item of equipment Int_COM1' can be any type of radio wireless communication interface enabling the secondary item of equipment EQ2 to communicate with the residential gateway GW and the main item of equipment EQ1 such as for example a communication interface of the Bluetooth, Z-Wave, Zigbee, DECT-ULE, 2.4 GHz or 6 GHz Wi-Fi, Li-Fi, 4G, 5G etc type.

In other words, the secondary item of equipment EQ2 can communicate with the main item of equipment EQ1 via a first communication channel and with the residential gateway GW via a second communication channel, these two channels being able to use the same communication protocol, or different communication protocols.

The general principle of the development is presented in relation to the examples in FIG. 2A and in FIG. 2B.

In these examples, the user UT wishes to access a service via the residential gateway GW, such as for example a service for consuming digital content. For this purpose, the user UT uses the secondary item of equipment EQ2 to control the main item of equipment EQ1 and to activate it.

Thus, in a conventional manner known from the prior art, in a step 21, the user UT activates the main item of equipment EQ1 by means of the secondary item of equipment EQ2 configured for controlling the main item of equipment EQ1. On demand by the user, the secondary item of equipment EQ2 transmits, in a step 21', a message controlling the main item of equipment EQ1 to the latter. In one example, this message controlling the main item of equipment EQ1 is transmitted via a wireless communication channel established between the communication interface Int_COM of the secondary item of equipment EQ2 and the communication interface Int_COM1' of the main item of equipment EQ1. This wireless communication channel is for example a communication channel of the BLE type.

In the example in relation to FIG. 2B, by pressing for example on a start/stop button, or on a wake-up button of the remote control 1, the user UT therefore sends a message controlling the set-top box STB, via for example the establishment of a BLE wireless communication channel, between a BLE communication interface Int_BLE of the remote control 1 and a BLE communication interface Int_BLE1' of the set-top box STB.

In order to reduce the energy consumption, one or more communication interfaces of the residential gateway GW are deactivated by default, for example cable communication interfaces of the Ethernet type, or wireless of the 5 GHz Wi-Fi type.

Thus, in a step 22, the secondary equipment EQ2 transmits a connection request to the communication interface Int_COM1 of the residential gateway GW via a communication channel, for example of the BLE type, prior to the transmission of a request for activating the communication interface Int_COM2 of the residential gateway GW. The secondary item of equipment EQ2 connects, via its wireless communication interface Int_COM, to a wireless communication interface Int_COM1 of the already active residential gateway GW. This is because the residential gateway also comprises one or more other communication interfaces consuming less energy, which are active by default and which enable certain items of equipment to communicate and exchange data with the residential gateway GW.

Prior to the transmission of a message controlling the main item of equipment EQ1, the secondary item of equipment EQ2 transmits, to the gateway GW, the request for activating one or more communication interfaces of the previously deactivated residential gateway Int_COM2. It should be noted that in a variant the activation request and the control message can be transmitted conjointly, or the activation request can be transmitted after the control message.

This request for activating the previously deactivated communication interface of the residential gateway Int_COM2 comprises information for activating this communication interface of the residential gateway Int_COM2.

In a variant, this request for activating the communication interface of the residential gateway Int_COM2 also comprises information on emerging from deep sleep of the residential gateway GW.

In a variant, this request for activating the communication interface of the residential gateway Int_COM2 also comprises an identifier of the communication interface of the residential gateway GW to be activated.

In the example in relation to FIG. 2B, the BLE wireless communication interface Int_BLE of the remote control 1 connects to the BLE wireless communication interface Int_BLE1 of the residential gateway GW. On request from the user, prior to the transmission of the message controlling the set-top box STB, the remote control 1 transmits, via a BLE communication channel, a request to activate the 5 GHz Wi-Fi communication interface Int_WiFi 5GHz_2 of the residential gateway GW to the latter.

In a step 23, the active communication interface Int_COM1 of the residential gateway GW decodes the request to activate the previously deactivated communication interface Int_COM2.

In the example in relation to FIG. 2B, it is the BLE communication interface Int_BLE1 of the gateway GW that decodes the request for activating the 5 GHz Wi-Fi wireless communication interface Int_WiFi 5GHz_2.

In a step 24, on reception of the request for activating the communication interface Int_COM2 coming from the secondary item of equipment EQ2, the residential gateway GW activates the communication interface Int_COM2, such as for example the 5 GHz Wi-Fi communication interface Int_WiFi 5GHz_2 of FIG. 2B.

In a variant, when the activation request comprises information for activating the previously deactivated communication interface Int_COM2 and information for emerging from deep sleep of the residential gateway GW, the residential gateway GW emerges from deep sleep and then activates its communication interface Int_COM2.

In a step 25, the main item of equipment EQ1 connects via its communication interface Int_COM2' to the activated interface Int_COM2 of the residential gateway GW to establish a communication and to exchange data.

In the example in relation to FIG. 2B, the set-top box STB connects to the network WLAN via a connection between its 5 GHz Wi-Fi compatible communication interface Int 5GHz_2' and the activated 5 GHz Wi-Fi communication interface Int_WiFi 5GHz_2 of the residential gateway GW.

Figure 3:
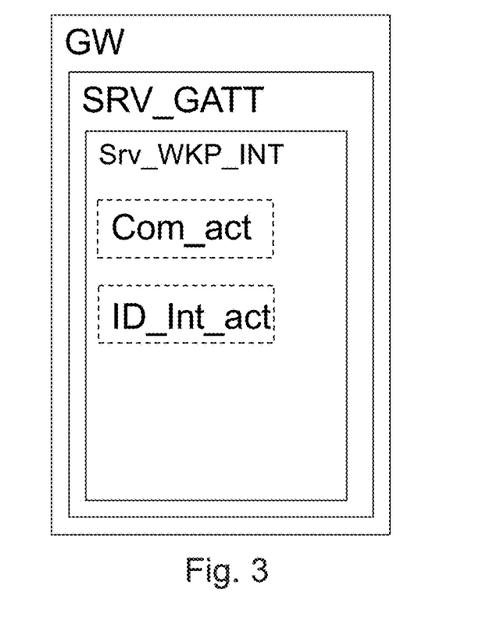
FIG. 3 illustrates schematically an example of hierarchisation of a proprietary protocol of a wireless communication protocol according to an embodiment of the development.

FIG. 3 illustrates an example of hierarchisation of a proprietary profile of a wireless communication protocol according to one embodiment of the development. In particular, FIG. 3 illustrates the hierarchisation of a proprietary profile according to a Bluetooth Low Energy or BLE communication protocol in the example in relation to FIG. 2B and FIG. 4, used for establishing a communication between the secondary item of equipment EQ2, such as the remote control 1, and the residential gateway GW on the one hand, and the main item of equipment EQ1, such as the set-top box STB, on the other hand.

The specification of the BLE standard provides for the possibility of creating proprietary profiles complying with the generic attribute protocol (GATT). A profile is defined in the GATT standard as a set of services and features for implementing certain applications. It is therefore possible to define proprietary features supported by a GATT server, using specific universally unique identifiers (UUIDs).

The residential gateway GW uses such a so-called "proprietary" profile of a GATT server SRV_GATT making it possible to wake up, or activate, communication interfaces of the previously deactivated gateway GW to save on energy. In other words, the residential gateway GW uses a service of waking up, or activating, its previously deactivated communication interfaces Srv_WKP_INT.

Figure 4:
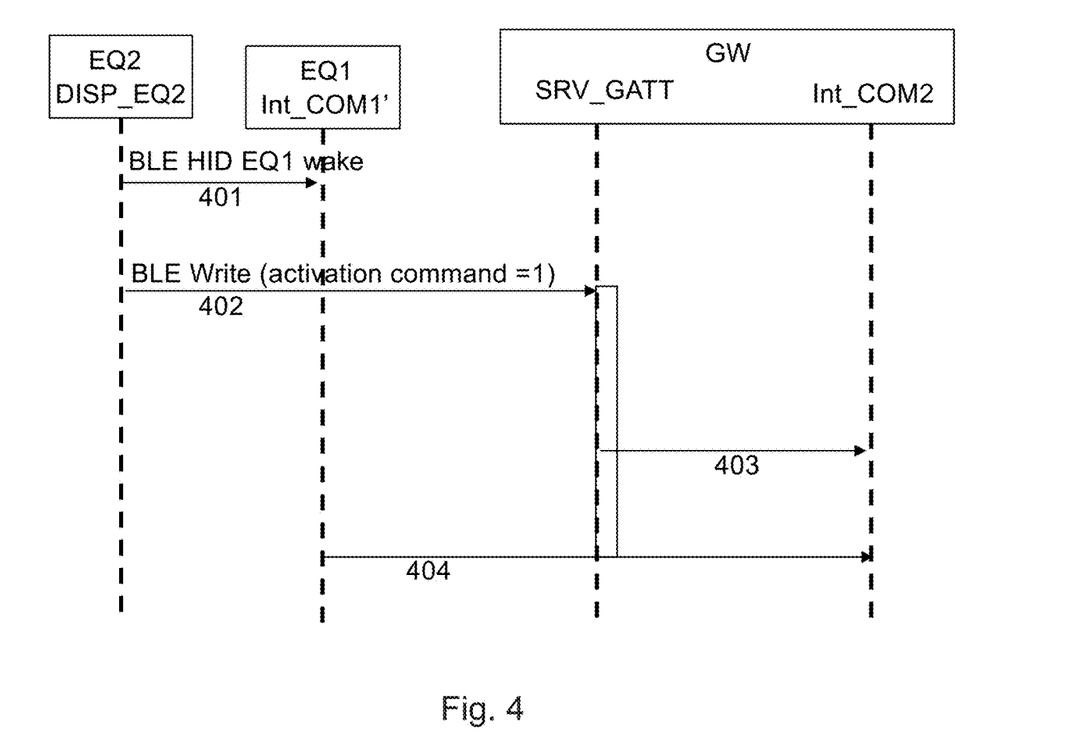
FIG. 4 presents, in the form of a flow diagram, the exchanges between the module for activating at least one communication interface of the residential gateway of a secondary item of equipment, a main item of equipment, and the gateway managing the local communication network, according to an example embodiment of the development.

On a request by the user UT, the GATT client, i.e., in the examples presented in relation to FIGS. 2A, 2B and 4, the secondary item of equipment EQ2 or remote control 1, next modifies the values of the attributes accessible in write mode of the features defined in the proprietary profile. In one example, one feature defined in the proprietary profile may be a command for activating one or more communication interfaces of the gateway GW that were deactivated by default COM act. After selection of the proprietary identifier associated with the profile, the GATT client modifies the value, for example 0 or 1 integer, attributed to the activation command feature COM act, to trigger the process of activating the communication interface of the gateway GW.

For this purpose, the GATT client, i.e. the secondary item of equipment EQ2, transmits, to the residential gateway GW, in particular to the GATT server of the gateway, a request for activating, or waking up, at least one communication interface deactivated by default of this gateway. This activation, or wake-up, request comprises in particular information for activating at least one communication interface deactivated by default, allowing modification of the value of the activation command feature COM act of the proprietary profile and therefore activation of the communication interface of interest.

In a variant, it is possible to define an additional feature, for example for selecting the communication interface of the gateway GW that is to be woken up, or activated. In the same way as before, after selection of the proprietary identifier associated with the profile, the GATT client modifies the value, for example "wlan0" or "wlan1", "eth0" or "eth1", attributed to the characteristic identifying the communication interface to be activated ID_Int_act, to trigger the process of activating the communication interface of the gateway GW selected.

For this purpose, the request for activating, or waking up, at least one communication interface deactivated by default of this gateway sent by the GATT client furthermore comprises information identifying at least one communication interface of the gateway, allowing modification of the value of the characteristic identifying the communication interface to be activated ID_Int_act of the proprietary profile and therefore activation of the communication interface of interest.

FIG. 4 illustrates, in the form of a flow diagram, the exchanges between a module for activating at least one communication interface of the residential gateway of the secondary item of equipment, the main item of equipment, and the gateway managing the local communication network, according to an example embodiment of the development.

Figure 5:
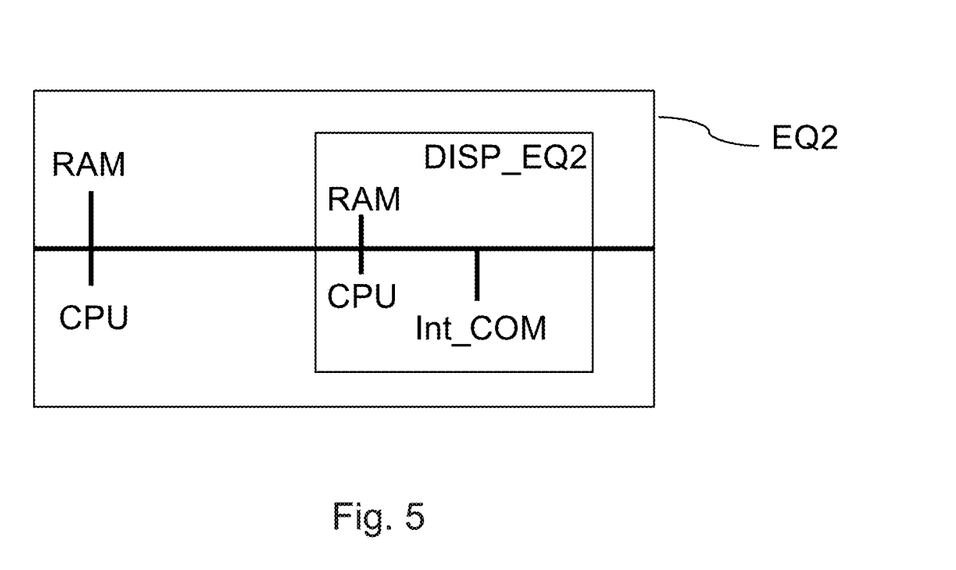
FIG. 5 illustrates schematically an example of architecture of an item of equipment connected to the local area network incorporating a module for activating at least one communication interface of the residential gateway, according to an embodiment of the development.

In the example in relation to FIG. 4, the module for activating at least one communication interface of the gateway of the secondary item of equipment DISP_EQ2, or activation module DISP_EQ2, presented in connection with FIG. 5, comprises a communication interface Int_COM, for example a communication interface of the BLE type, allowing the establishment of a connection between the secondary item of equipment EQ2 and the main item of equipment EQ1.

Thus, in a step 401, the user UT activates the main item of equipment EQ1 by means of the secondary item of equipment EQ2 configured for controlling the main item of equipment EQ1. For this purpose, the secondary item of equipment EQ2, via the establishment of a wireless communication channel between the communication interface Int_COM of its activation module DISP_EQ2 and the communication interface Int_COM1' of the main item of equipment EQ1, transmits a control message to the main item of equipment EQ1.

In one example, the message controlling the main item of equipment EQ1 may be a control message of the type: BLE HID EQ1 wake-up.

In a step 402, prior to the transmission of the message controlling the main item EQ1, the secondary item of equipment EQ2 transmits, to the residential gateway, via the communication interface Int_COM of its activation module DISP_EQ2, a request for activating, or waking up, one or more communication interfaces of the residential gateway that were previously deactivated.

In one example, this request for activating at least one previously deactivated communication interface of the gateway GW comprises information for activating the previously deactivated communication interface, and is of the type: BLE Write (activation command=1).

In a variant, this activation request also comprises an identifier of the communication interface to be activated, for example one or more wireless "wlan1" or cable "eth1" communication interfaces.

In a step 403, the residential gateway GW demands activation of the communication interface or interfaces Int_COM2 of the gateway GW.

In a step 404, the main item of equipment EQ1 then connects to the network WLAN via its communication interface Int_COM2' to the activated interface Int_COM2 of the residential gateway GW.

In order more precisely to illustrate the principle of the development, FIG. 5 presents schematically an example of architecture of a secondary item of equipment EQ2 incorporating a module for activating at least one communication interface of the residential gateway DISP_EQ2 according to one embodiment of the development.

The activation module DISP_EQ2 comprises a random access memory RAM (for example a RAM memory), a processing unit CPU equipped for example with a processor, and driven by a computer program stored in a read only memory (for example a ROM memory or a hard disk). On initialisation, the computer program code instructions are for example loaded into the random access memory RAM before being executed by the processor of the processing unit CPU.

The activation module DISP_EQ2 furthermore comprises a wireless communication interface Int_COM enabling the secondary item of equipment to establish a communication.

FIG. 5 illustrates only one particular way, among several possible ones, of implementing the activation module DISP_EQ2, so that it implements the steps of the methods for activating at least one communication interface of the gateway GW detailed above, in relation to FIGS. 2A, 2B and 4 in the various embodiments thereof. This is because these steps can be implemented indifferently on a reprogrammable computing machine (a PC computer, a DSP processor or a microcontroller) executing a program comprising a sequence of instructions, or on a dedicated computing machine (for example a set of logic gates such as an FPGA or an ASIC, or any other hardware module).

In the case where the activation module DISP_EQ2 is implemented with a reprogrammable computing machine, the corresponding program (i.e. the sequence of instructions) can be stored in a removable storage medium (such as for example an SD card, a USB stick, a CD-ROM or a DVD-ROM) or a non-removable one, this storage medium being able to be read partially or totally by a computer or a processor.

The invention claimed is:

1. A method of activating at least one communication interface of a residential gateway of a local communication network to which at least one communication interface of at least one main item of equipment connected to the at least one communication interface of the residential gateway is connected, the method being implemented by at least one secondary item of equipment in communication with the at least one main item of equipment via a first wireless communication channel established between the at least one secondary item of equipment and at least one other communication interface of the at least one main item of equipment, and with the residential gateway via a second wireless communication channel established between the at least one secondary item of equipment and at least one other communication interface of the residential gateway, wherein the method comprises:
   the at least one secondary item of equipment transmitting to the at least one main item of equipment, over the first wireless communication channel, a message controlling the at least one main item of equipment, and
   the at least one secondary item of equipment transmitting to the residential gateway, over the second wireless communication channel, a request to wake-up or to switch on the at least one communication interface of the residential gateway.

2. The activation method according to claim 1, wherein the request to activate the at least one communication interface is transmitted prior to the transmission to the at least one main item of user equipment of the message controlling the at least one main item of equipment.

3. The activation method according to claim 1, wherein the request to activate the at least one communication interface comprises information for activating the at least one communication interface.

4. The activation method according to claim 3, wherein the request to activate the at least one communication interface furthermore comprises information identifying the at least one communication interface.

5. The activation method according to claim 1, wherein the first wireless communication channel and the second wireless communication channel are based on a communication protocol selected from: Bluetooth, Bluetooth Low Energy, Z-Wave, Zigbee, DECT-ULE, Li-Fi, 4G, 5G or 6 GHz Wi-Fi.

6. The activation method according to claim 1, wherein the first wireless communication channel and the second wireless communication channel are based on one and the same communication protocol.

7. An item of equipment in communication with a main item of equipment via a first wireless communication channel, and with a residential gateway of a local communication network to which at least one communication interface of the at least one main item of equipment is connected via a second wireless communication channel, wherein the item of equipment comprises a module for activating at least one communication interface of the residential gateway to which the at least one communication interface of the main item of equipment is able to connect, the communication interface being distinct from a communication interface with which the second wireless communication interface is associated, the first wireless communication channel being established between the item of equipment and at least one other communication interface of the at least one main item of equipment and the second wireless communication channel being established between the item of equipment and at least one other communication interface of the residential gateway, and in that the activation module of the item of equipment is configured to:

transmit a control message to the at least one main item of equipment over the first wireless communication channel; and transmit to the residential gateway a request to wake-up or to switch on the at least one communication interface over the second wireless communication channel.

8. A processing circuit comprising a processor and a non-transitory memory, the non-transitory memory storing program code instructions of a computer program for implementing the activation method according to claim 1, when the program is executed by the processor.

9. A system for activating at least one communication interface of a residential gateway of a local communication network to which at least one main item of equipment configured for connecting to the at least one communication interface of the residential gateway is connected, wherein the system comprises a residential gateway and at least one item of equipment, referred to as a secondary item of equipment, according to claim 7.

* * * * *